US009868561B2

(12) United States Patent
Kiguchi et al.

(10) Patent No.: US 9,868,561 B2
(45) Date of Patent: Jan. 16, 2018

(54) STORAGE CONTAINER

(71) Applicant: HONDA MOTOR CO., LTD., Tokyo (JP)

(72) Inventors: Kazunori Kiguchi, Wako (JP); Naoki Maruno, Wako (JP); Yasuhiro Matsumoto, Wako (JP); Takuya Furuichi, Wako (JP); Narihiro Misu, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 61 days.

(21) Appl. No.: 15/209,405

(22) Filed: Jul. 13, 2016

(65) Prior Publication Data
US 2017/0029158 A1 Feb. 2, 2017

(30) Foreign Application Priority Data

Jul. 30, 2015 (JP) ................. 2015-151014

(51) Int. Cl.
*B65D 1/40* (2006.01)
*G06K 19/07* (2006.01)
*G06K 7/00* (2006.01)
*G06K 7/10* (2006.01)
*H01M 2/02* (2006.01)
*H01M 2/10* (2006.01)

(52) U.S. Cl.
CPC ............. *B65D 1/40* (2013.01); *G06K 7/0008* (2013.01); *G06K 19/0723* (2013.01); *G06K 7/10108* (2013.01); *H01M 2/0267* (2013.01); *H01M 2/1061* (2013.01)

(58) Field of Classification Search
CPC .... B65D 1/40; G06K 19/0723; G06K 7/0008; G06K 7/10108; H01M 2/0267; H01M 2/1061; H01M 2/0275; G06Q 10/087
USPC ......... 340/10.1, 10.32, 10.4, 572.4; 320/106, 320/107
See application file for complete search history.

(56) References Cited

U.S. PATENT DOCUMENTS

| 6,069,468 | A | 5/2000 | Sonobe |
| 7,576,657 | B2 | 8/2009 | Duron et al. |
| 7,579,808 | B2 | 8/2009 | Haraguchi et al. |
| 7,924,161 | B1 * | 4/2011 | Spindel ............... G06K 7/0008 235/385 |

(Continued)

FOREIGN PATENT DOCUMENTS

JP 2000-30757 A 1/2000

*Primary Examiner* — Ali Neyzari
(74) *Attorney, Agent, or Firm* — Westerman, Hattori, Daniels & Adrian, LLP

(57) ABSTRACT

To provide a storage container that employs a metallic housing while allowing individual identification of a contained object by means of radio wave communication with an electronic tag of a managed object in the housing. A storage container 1 comprising: a metallic housing 10 for enclosing battery modules 11, 12, 13, 14 as managed objects with electronic tags 21, 22, 23, 24 for individual identification being attached thereto; and an opening portion 15 that is provided on the metallic housing 10 and has an opening being formed therein, the opening constituting a radio wave propagation path between the electronic tags 21, 22, 23, 24 of the battery modules 11, 12, 13, 14 enclosed in the metallic housing 10 and exterior of the metallic housing 10.

4 Claims, 6 Drawing Sheets

(56) References Cited

U.S. PATENT DOCUMENTS 9,152,908 B2 10/2015 Ahler et al.
2006/0267544 A1 11/2006 Montvay et al.

* cited by examiner

STORAGE CONTAINER

This application is based on and claims the benefit of priority from Japanese Patent Application No. 2015-151014, filed on 30 Jul. 2015, the content of which is incorporated herein by reference.

BACKGROUND OF THE INVENTION

Field of the Invention

The present invention relates to a storage container, and particularly to a storage container suitable for individual identification of a contained object.

Related Art

In recent years, AIDC (Automatic Identification and Data Capture) such as RFID (Radio Frequency Identification) is widespread, and various proposals have been made relating to identification of battery type and battery state. Some of these proposals are considered applicable to functions other than charge and discharge required upon remanufacturing (repair and reuse) of battery packs for electric vehicles, such as misassembly prevention, copy and illegal modification prevention, history recording, etc.

For example, one of the proposals identifies a user of a battery through communication with an electronic tag attached to a standard battery (see for example US Patent Application Publication No. 2006/0267544, hereinafter referred, to as Patent Document 1). In the art disclosed in Patent Document 1, a user can advantageously equip any of his apparatuses (e.g. watch, pocket calculator, PDA, remote control, flashlight, etc.) with a battery configuration, according to the invention and use it for communication/identification with a communication device.

Another proposal provides an electronic tag carrying predetermined information and bonded to a surface of the battery and to an inner face of the pack case, and is configured such that the information recorded on the IC tag cannot be read out in the case of the battery pack having been disassembled or modified (see for example U.S. Pat. No. 7,579,808, hereinafter referred to as Patent Document 2). The art disclosed in Patent Document 2 can prevent connection of a counterfeit, by allowing detection of disassembly and modification, and preventing connection to a loading device and a charging device.

Yet another proposal comprises, in a battery pack, rewritable memory along with a secondary battery, and makes specific information and status information of the battery pack stored in the memory rewritable when the battery pack operates in a testing mode, while making the specific information non-rewritable when the battery pack operates in a normal mode (see for example Japanese Unexamined Patent Application Publication No. 2000-030757, hereinafter referred to as Patent Document 3). The art disclosed in Patent Document 3 facilitates a test at the time of manufacture or maintenance of the battery pack and allows quick check of remaining capacity of the battery pack. Since the specific information of the battery is stored in the memory, operation mode can easily be selected to match the equipment type.

SUMMARY OF THE INVENTION

In the case of an electronic tag that is capable of radio wave communication being attached to a cell or a module in the battery pack, individual identification of the cell, or the module is possible with the battery pack being installed in a vehicle. Reliability, efficiency and safety of manufacturing can thus be secured and improvement in cost effect can foe expected. However, due to an electromagnetic shield effect of an outer metallic casing of the battery pack, accuracy of communication or identification by the electronic tag is not at a practical level.

An objective of the present invention is, taking into consideration in a broader way problems of the above described use of the outer metallic casing of the battery pack, to provide a storage container that employs a metallic housing while allowing individual identification of a contained object by means of radio wave communication with an electronic tag of a managed object in the housing.

The following art is proposed in order to achieve the abovementioned objective. A first aspect of the invention is a storage container (e.g. storage container 1 described later) including: a metallic housing (e.g. metallic housing 10; metallic cabinet 30 described later) for enclosing a managed object (e.g. battery module 11, 12, 13, 14; chemical container 40) with an electronic tag (e.g., electronic tag 21, 22, 23, 24, 50 described later) for individual identification being attached thereto; and an opening portion (e.g. opening portion 15, 35, 36 described later) that is provided on the metallic housing and has an opening being formed therein, the opening constituting a radio wave propagation path between the electronic tag of the managed object enclosed in the metallic housing and exterior of the metallic housing and having a longitudinal length that is at least equal to a half wavelength of the radio wave to be transmitted.

With the storage container of the first aspect, communication by radio wave of favorable quality can be established between an electronic tag attached to the managed object stored in the metallic housing and a reading device outside the metallic housing (for example, reading devices 200, 200*a* described later), through the radio wave propagation path, which is an opening in the opening portion. Individual identification of the managed object stored in the metallic housing is possible.

According to a second aspect of the present invention, in the storage container of the first aspect, the opening of the opening portion is sealed with a radio wave transmissive member.

The storage container of the second aspect is the storage container of the first aspect, in which the opening of the opening portion is sealed with a radio wave transmissive member, to thereby prevent operation of the managed object from outside the storage container through the opening and improve security.

According to a third aspect of the present invention, the storage container of the first or second aspect has a metallic reflective plate (e.g. battery frame 17, which is a metallic plate, described later) that is provided in the metallic housing, at a position facing the electronic tag.

The storage container of the third aspect is the storage container of the first or second aspect, in which communication efficiency can be increased by means of the metallic reflective plate.

The present invention can provide a storage container employing a metallic housing while allowing individual identification of an object enclosed therein by communication with an electronic tag by radio wave.

DETAILED DESCRIPTION OF THE INVENTION

Figure 1:
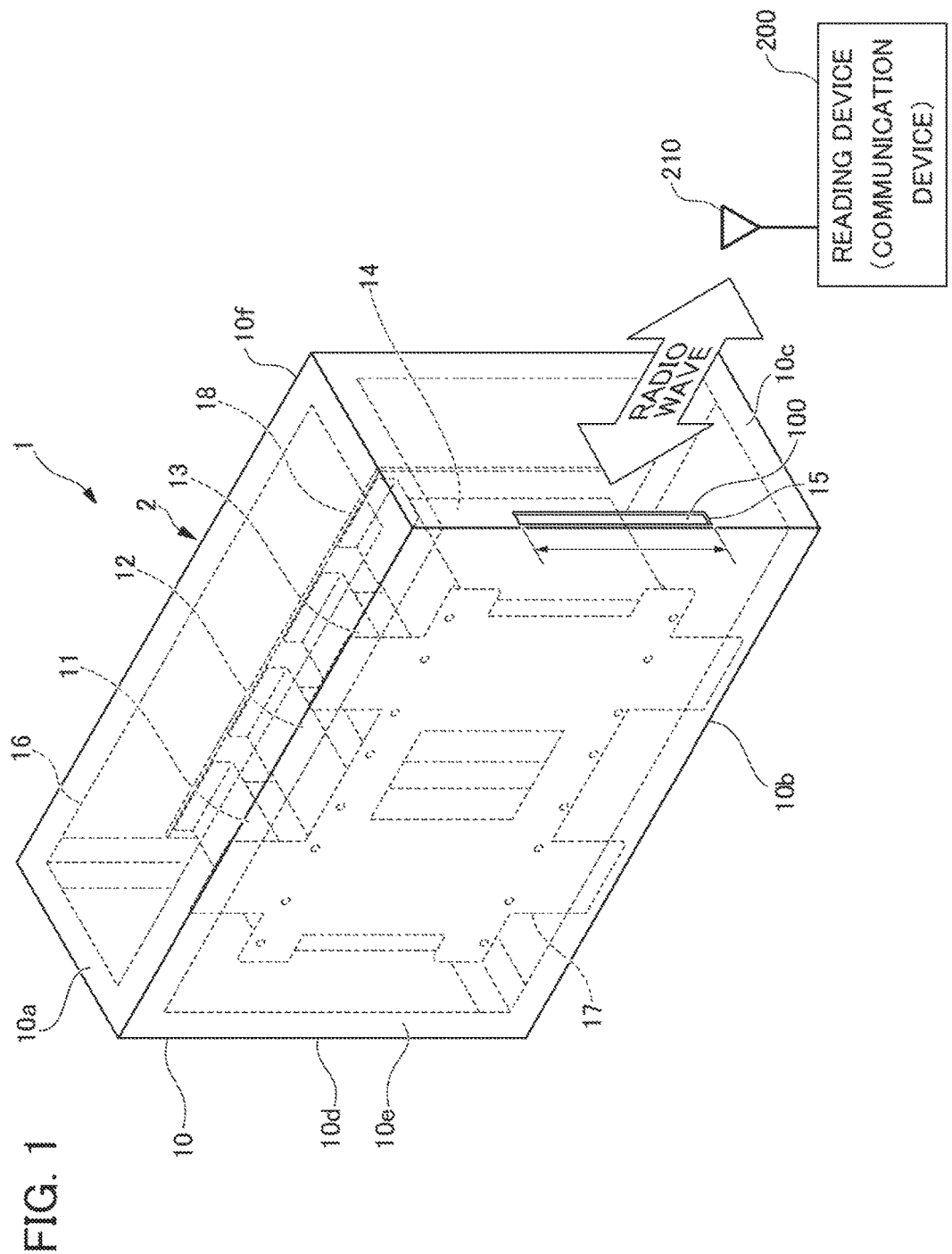
FIG. 1 is a diagram illustrating a battery pack employing the storage container of the present invention.

The present invention is unveiled hereinafter by describing embodiments thereof in detail with reference to drawings. FIG. 1 is a diagram illustrating a battery pack employing the storage container of the present invention. In FIG. 1, a metallic housing constituting a major part of a storage container of the present invention is designated by 10, in which a plurality of (4 in the present embodiment) battery modules 11, 12, 13, 14 as the managed objects with electronic tags for individual identification attached thereto are enclosed (described later, not illustrated in FIG. 1), thus collectively configured as a battery pack2. The battery modules 11, 12, 13, 14 are respectively configured with, for example, a rechargeable, battery with a plurality of rechargeable cells enclosed in a rechargeable battery case body, and an electronic circuit electrically connected to the rechargeable battery.

The metallic housing 10 has a substantially cuboidal shape. Herein, plate-like portions constituting outer shape of the metallic housing 10 in a general installed posture in the drawings are referred to as follows:

First outer face portion 10a (plate-like portion constituting a top face);

Second outer face portion 10b (plate-like portion constituting a bottom face);

Third outer face portion 10c (plate-like portion constituting one of a pair of lateral faces which are relatively smaller than another pair of lateral faces);

Fourth outer face portion 10d (plate-like portion constituting the other of a pair of lateral faces which are relatively smaller than another pair of lateral faces);

Fifth outer face portion 10e (plate-like portion constituting one of a pair of lateral faces which are relatively larger than another pair of lateral faces); and Sixth outer face portion 10f (plate-like portion constituting the other of a pair of lateral faces which are relatively larger than another pair of lateral faces).

On the third outer face portion 10c of the metallic housing 10, an opening portion 15 including an opening with a radio wave transmitting region 100, which is a vertically elongated slit-like gap, is provided at a center in a vertical direction along an edge with the fifth outer face portion 10e. In other words, the radio wave transmitting region 100 is a void that makes the inside and the outside, of the metallic housing 10 communicate with each other. The opening in the opening portion 15 composes a radio wave propagation path between the electronic tags attached as described later to the battery modules 11, 12, 13, 14, as the managed objects, enclosed in the metallic housing 10 and (an antenna 210 of) a reading device 200 outside of the metallic housing 10. The reading device 200 is a communication device that communicates with the electric tag.

Figure 2:
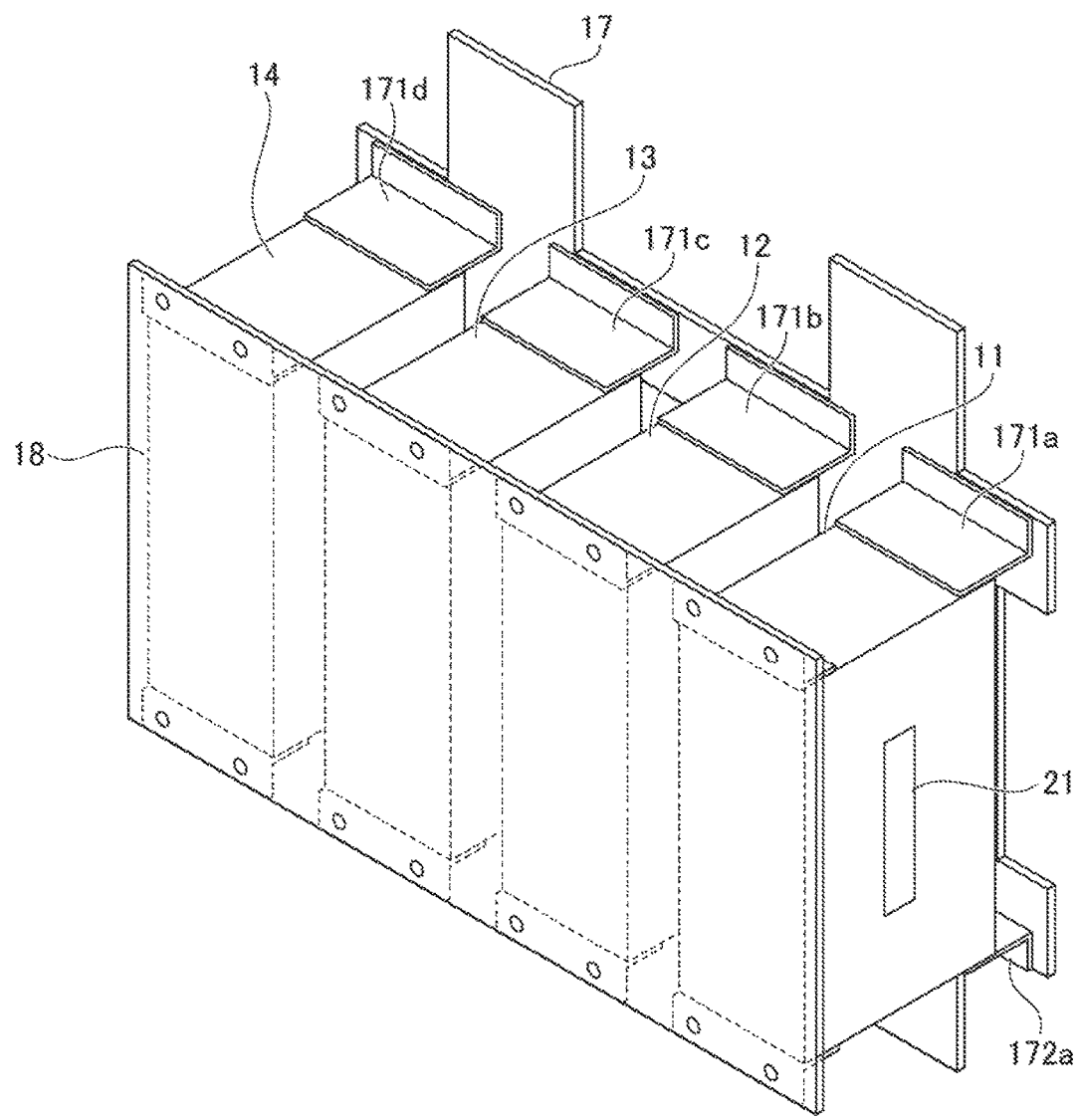
FIG. 2 is a diagram illustrating an example of a supporting structure of a battery module in the battery pack of FIG. 1.

A supporting structure of the battery modules 11, 12, 13, 14 is described hereinafter with reference to FIGS. 1 and 2, FIG. 2 is a diagram illustrating an example of a supporting structure of the battery modules 11, 12, 13, 14 in the battery pack 2 of FIG. 1. In FIG. 2, parts identical to FIG. 1 are referred to with the same reference numerals. FIG. 1 is taken from a side of the third outer face portion 10c of the metallic housing 10, while FIG. 2 is taken from a side of the fourth outer face portion 10d. A frame member 16 as a reinforcing member is provided along outer edges of the metallic housing 10. A plate-like battery frame 17, which supports the four cuboidal battery modules 11, 12, 13, 14 at predetermined positions, is provided along an inner face of the fifth outer face portion 10e, such that upper and lower ends thereof are supported by the frame member 16.

The battery frame 17 is provided, with horizontally projecting plate-like upper brackets 171a, 171b, 171c, 171d, which support the respective battery modules 11, 12, 13, 14. In addition, horizontally projecting lower brackets 172a, 172b, 172c, 172d are provided to oppose vertically the respective upper brackets 171a, 171b, 171c, and 171d. The lower brackets 172b, 172c, 172d are not shown from a point of view in FIG. 2.

Meanwhile, faces of the battery modules 11, 12, 13, 14 opposite to the battery frame 17 are connected by means of a common connecting plate 18. In the metallic housing 10, the connecting plate 18 is provided along an inner face of the sixth outer face portion 10f. The battery modules 11, 12, 13, 14 are supported and enclosed at certain distances from peripheral walls of the metallic housing 10, by means of the battery frame 17, the upper brackets 171a, 171b, 171c, 171d and the lower brackets 172a, 172b, 172c, 172d projecting therefrom, as well as the connecting plate 18.

Figure 3:
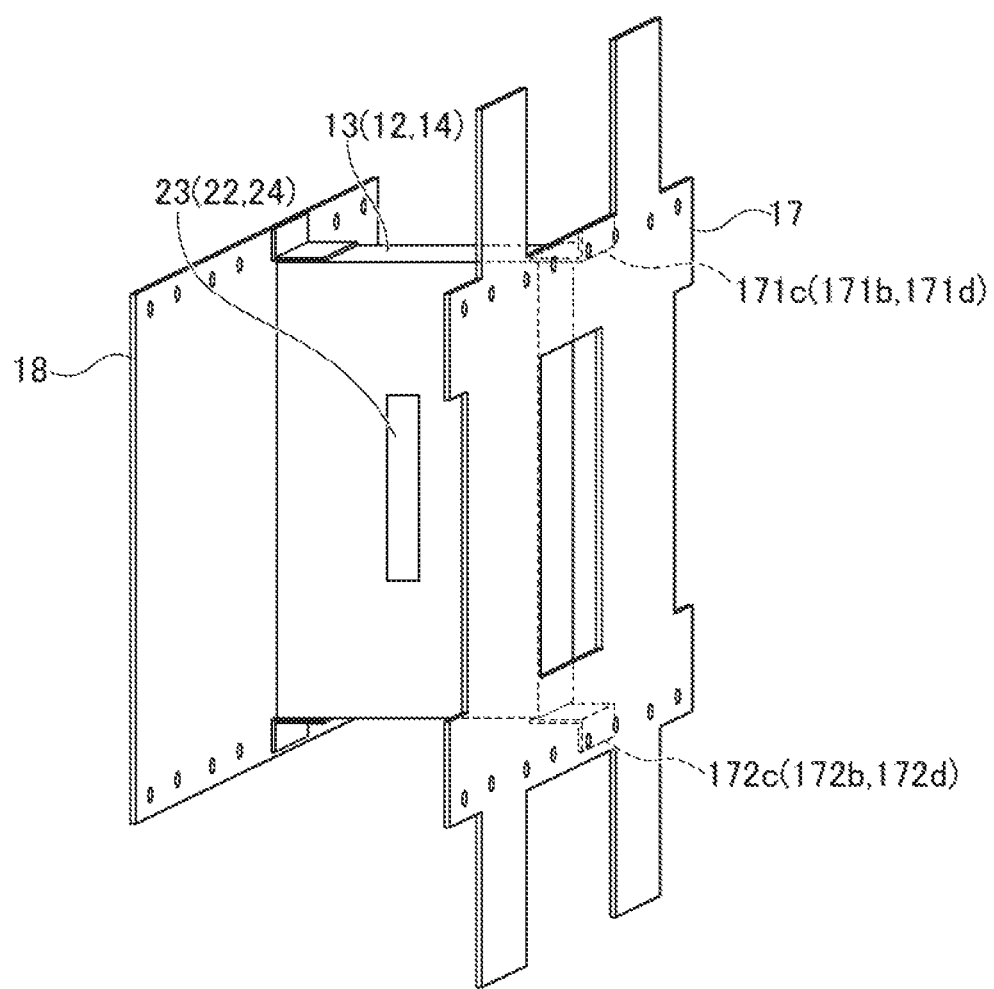
FIG. 3 is a diagram illustrating an example of an embodiment with an electronic tag being attached to the battery module in the battery pack of FIG. 1.

An example of an embodiment with electronic tags being attached to the battery modules 11, 12, 13, 14 is described hereinafter with reference to FIGS. 2 and 3. FIG. 3 is a diagram illustrating an example of an embodiment with an electronic tag being attached to one of battery modules in the battery pack of FIG. 1. In FIG. 3, parts identical to FIG. 2 are referred to with the same reference numerals and each member is symbolically illustrated for the sake of explanation. In the example of FIG. 3, the electronic tags 21, 22, 23, 24 are attached to the respective battery modules 11, 12, 13, 14, in a substantially central portion of a face directed to the third outer face portion 10c.

As a result, the electronic tags 21, 22, 23, 24 attached to the respective battery modules 11, 12, 13, 14 each have a principal surface being substantially opposite to the opening in the opening portion 15. In such an arrangement, the electronic tag 21 attached to the battery module 11 is closest to the opening in the opening portion 15, the electronic tag 24 attached to the battery module 14 is farthest from the opening in the opening portion 15, and the electronic tags 22 and 23 attached to the battery modules 12 and 13 attached to the battery modules 12 and 13 are in between these.

In one embodiment of the present invention, a technical feature is in selection of a size of the radio wave transmitting region 100 composed of the opening in the opening portion 15. As already discussed above, the opening in the opening portion 15 provided on the metallic housing 10 in the embodiment of FIG. 1 composes the radio wave transmitting region 100, which is a radio wave propagation path between the inside and the outside of the metallic housing 10. The present inventors have examined, for such a case of the radio wave transmitting region 100 being void, a relationship between its size and an electromagnetic coupling amount (hereinafter referred to as coupling amount) of inside and outside of the metallic housing 10 under various conditions, and then have found a remarkable tendency shown in FIG. 4.

Figure 4:
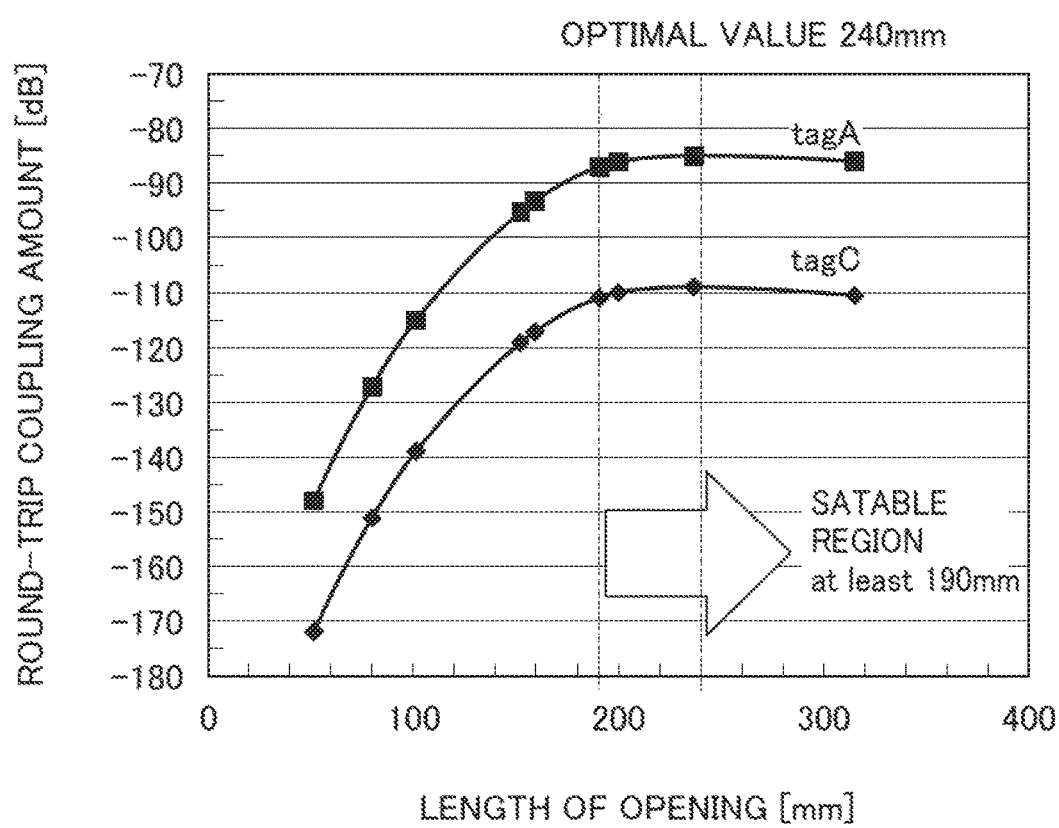
FIG. 4 is a diagram illustrating an coupling amount characteristic of the opening in the opening portion of the storage container of the present invention.

FIG. 4 is a diagram illustrating a coupling amount characteristic, which is a relationship between the size (length in the longitudinal direction) of the opening in the opening portion 15, which is the radio wave transmitting region 100, of the storage container 1 (metallic housing 10). Measurement conditions were as follows: the metallic housing 10 had no slit etc. for transmitting radio waves, other than the opening in the opening portion 15; the reading device 200 (antenna 210) was installed 50 mm away from the radio wave transmitting region 100 in the opening portion 15; and a width W of the radio wave transmitting region 100 (opening in the opening portion 15) was 20 mm (fixed) and a length L was changed for each measurement.

Among the above described four electronic tags, the electronic tag 21 (referred to as "tagA" in the diagram) closest to the opening in the opening portion 15, and the electronic tag 23 (referred to as "tagC" in the diagram) positioned intermediately were subjected to the coupling amount measurement. As a result, of the: measurements under the above specified conditions, the characteristics shown in FIG. 4 were found. In FIG. 4, the abscissa represents the length L (mm) of the radio wave transmitting region 100 (opening in the opening portion) and the ordinate represents the round-trip coupling amount (dB). The characteristics shown in FIG. 4 indicate the following:

the coupling amount is stably high with at least L=190 mm (approx. 0.6 wavelength); and the optimal value is L=2.40 mm (approx. 0.75 wavelength).

The above results show that a preferable coupling amount can be obtained with the length L of the radio wave transmitting region 100 (opening of the opening portion) being at least approx. half wavelength.

The following literature can be exemplified as a reference document relating to frequency bands to be used in the electronic tags.

"RF Tagu Mo Kaihatsu To Ohyo II [Development and Application of RF Tag 11]", Japan Automatic Identification Systems Association (Supervision), May 30, 2004, CMC Publishing Co., Ltd., ISBN:4-88231-446-0, Chapter 5 "ISO No Hatten Jokyo [Development state of ISO]", Section 3 "Mono No Kanri-Yo RF Tagu [RF Tags for Management of Things]"3.6 "ISO/IEC18000-6" and 3.7 "ISO/IEC18000-7" (pp. 49-63), Chapter 7 "Denshi Tagu Mo Aratana Shiruhasuu Ni Tsuite [New Frequencies for Electronic Tags]", Section 3 "Arata Ma Shuuhasuu No Riyou Kanousei [Applicability of New Frequencies]", 3.2 "(1)800/900 MHz" and "(2)433 MHz" (pp. 74-80)

Figure 5:
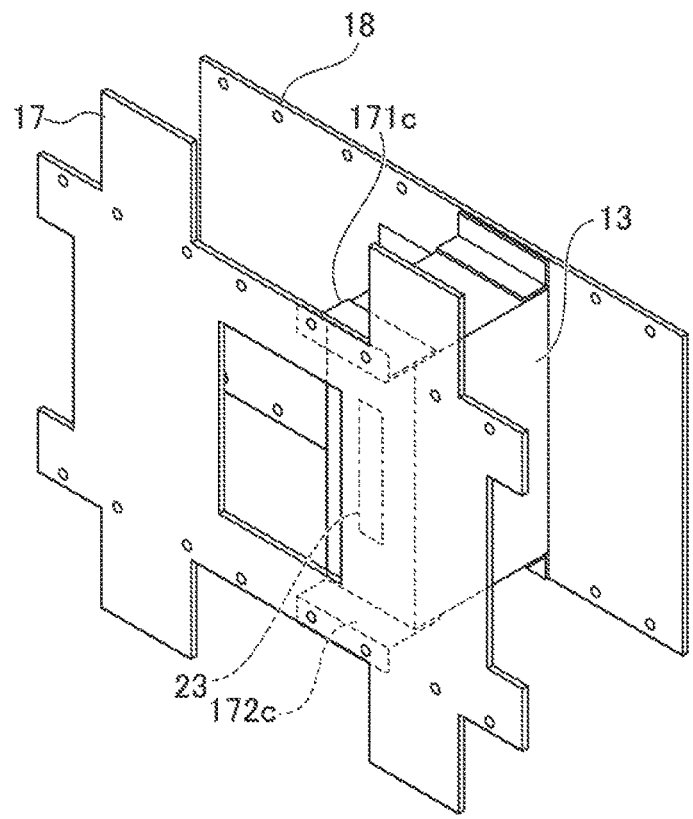
FIG. 5 is a diagram illustrating another example of the embodiment with an electronic tag being attached to the battery module in the battery pack of FIG. 1.

FIG. 5 is a diagram illustrating another example of the embodiment with an electronic tag being attached to the battery module in the battery pack of FIG. 1. In FIG. 5, parts identical to FIG. 3 are referred to with the same reference numerals. In the example of FIG. 5, the electronic tags 21, 22, 23, 24 are attached to the respective battery modules 11, 12, 13, 14, in a substantially central portion of a face directed to the battery frame 17 provided along the fifth outer face portion 10e. In other words, the electronic tags 21, 22, 23, 24 are arranged to be directed to the battery frame 17, which is a metallic plate. FIG. 5 illustrates the electronic module 13 with the electronic tag 23 being attached as a representative.

Figure 6:
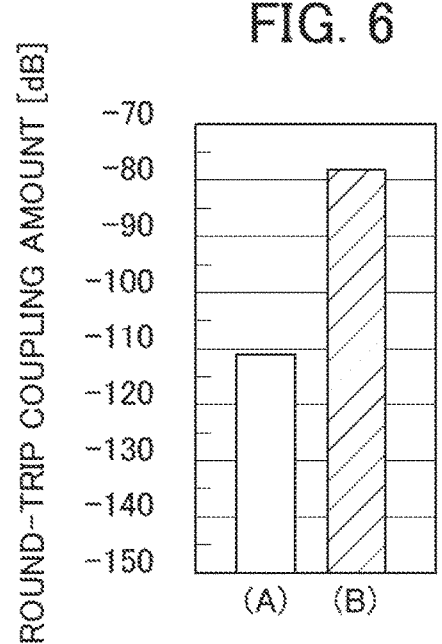
FIG. 6 is a diagram illustrating a relationship between an attached position of the electronic tag on the managed object stored in the storage container of the present invention and the coupling amount at the opening in the opening portion.

FIG. 6 is a diagram illustrating a relationship between an attached position of the electronic tag on the managed object stored in the storage container of the present invention and the coupling amount at the opening in the opening portion. In particular, a comparison between the attached position of the electronic tag (electronic tag 23 attached to the battery module 13) of FIG. 3 and that of FIG. 5 is provided. In the diagram, the case of FIG. 3 is referred to as (A) and the case of FIG. 5 is referred to as (B). FIG. 6 indicates that the attached position of the electronic tag (electronic tag 23) illustrated in FIG. 5 provides a greater round-trip coupling amount than that of FIG. 3. In other words, arranging the electronic tag in an orientation toward a metallic member (battery frame 17 which is a metallic plate) as illustrated in FIG. 5 further increases communication intensity.

The storage container 1 having been described with reference to FIGS. 1 to 6 as an embodiment of the present invention is the metallic housing 10 serving as an outer package body of the battery pack 2, provided with the opening portion 15 having an opening constituting the radio wave propagation path, on the third outer face portion 10c. The storage container 1 thus allows preferable communication by radio wave between the electronic tags (21 to 24) attached to the battery modules (11 to 14) stored in the metallic housing 10 and the reading device 200 outside the metallic housing 10, through the radio wave propagation path (opening In the opening portion 15). As a result, individual identification of the battery modules (11 to 14), which are managed objects stored in the metallic housing 10, is possible without hindrance.

It should foe noted that, in the metallic housing 10 as the storage container 1 in the above described embodiment, the radio wave propagation path (opening in the opening portion 15) is a void that makes the inside and the outside of the metallic housing 10 communicate with each other; however, the configuration of the opening portion 15 is not limited thereto. More specifically, the opening in the opening portion 15 can be any radio wave transmissive part provided on the metallic housing 10 constituting the radio wave propagation path between the electronic tags (21 to 24) of the managed object, e.g. the battery module (11 to 14), stored in the metallic housing 10 and the outside of the metallic housing 10, in which at least a part of the radio wave transmissive part has, for example, a radio wave transmitting region made of plastic etc. having higher radio wave transmittance than a metallic material. Therefore, the opening portion 15 can be configured to have an opening (radio wave transmitting region 100) sealed with a radio wave transmissive member such as plastic. In such a case, operation of the managed object from outside the storage container through the opening can be prevented, thereby improving safety and crime preventive performance.

Figure 7:
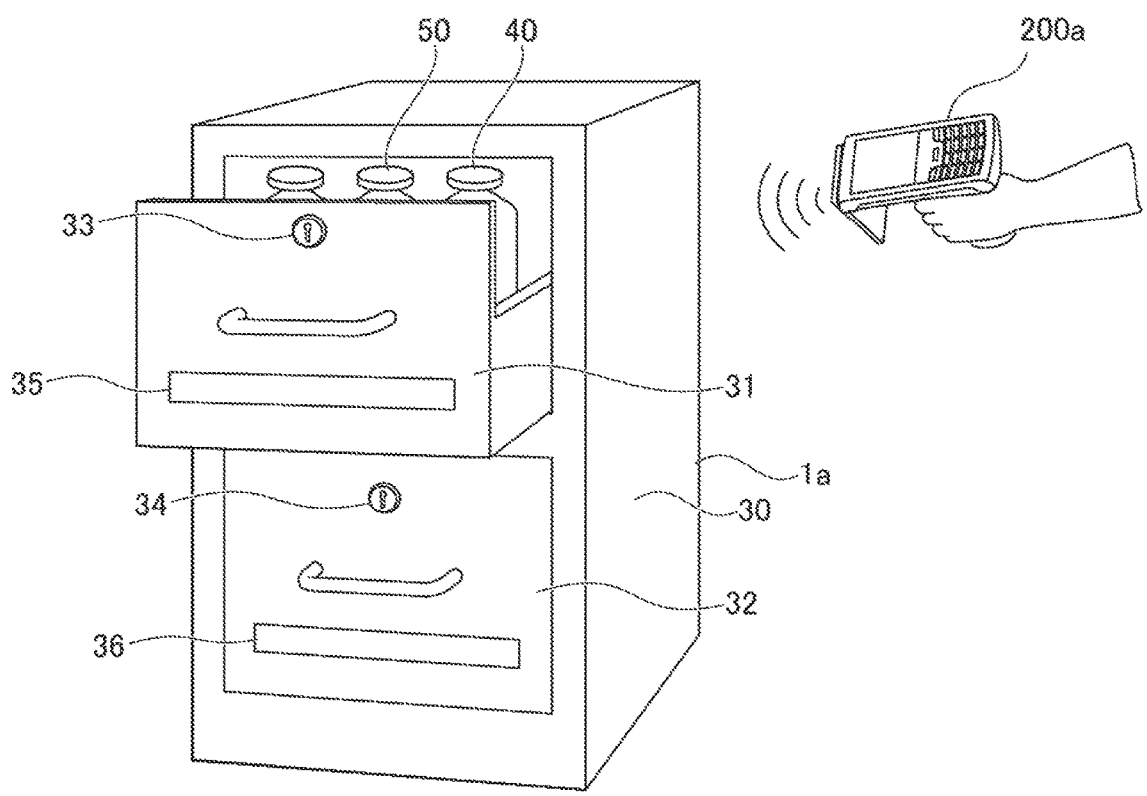
FIG. 7 is a diagram illustrating an example of the storage container of the present invention being configured as a chemical cabinet.

FIG. 7 is a diagram illustrating an example of the storage container of the present invention being configured as a metallic cabinet such as a medicament storage case. The storage container 1a of FIG. 7 of the present invention is a metallic cabinet 30 with a metallic housing, whose principal application is a medicament storage case. The metallic cabinet 30 of FIG. 7 is in a shape of a so-called steel cabinet, comprising an upper drawer 31 and a lower drawer 32 respectively storing managed objects such as a chemical container 40. The upper drawer 31 has a lock 33 and the lower drawer 31 has a lock 34. In addition, the upper drawer 31 has an opening portion 35 in which an opening is formed and the lower drawer 32 has an opening portion 36 in which an opening is formed.

Function of the opening portions 35 and 36 is the same as the opening portion 15 of FIG. 1 and radio wave communication can be established between the reading device 200a outside the metallic cabinet 30 and the electronic tag 50 attached to the managed object being stored such as the chemical container 40, through the openings in the opening portions 35 and 36. A remarkable phenomenon in the metallic cabinet 30 is that, when a radio wave is radiated from the reading device 200a toward the opening of the opening portion 35 (36) of the metallic cabinet 30., the radio wave enters into the metallic, cabinet 30 (upper drawer 31 and lower drawer 32) and is diffusedly reflected by metallic surfaces therein. The radio wave is thus diffused broadly inside the metallic cabinet 30 and communication with the electronic tag 50 on the chemical container 40 wherever in the metallic cabinet can be established. As a result, identification of the chemical, which is the managed object, stored in the metallic container 30 is possible without unlocking the locks 33, 34. In other words, the storage container of FIG. 7 (metallic cabinet used as medicament storage case etc.) employing a metallic housing can allow individual identification of an object enclosed therein by communication with an electronic tag of the managed object in the housing by radio wave.

In general, the medicament storage case (metallic cabinet 30) is provided with a lock for a security reason and chemicals in the medicament storage case cannot be identified unless the lock is unlocked and a door is open. Given this, it has been contemplated to provide transparent glass to make the inside visible; however, there have still been problems of a label identifying chemical being attached to an invisible part, and some labels being visually unrecognizable in a case where numerous chemical containers are stored.

On the contrary, in the medicament storage case (metallic cabinet 30) according to the embodiment of the present invention, the chemical 4 stored in the metallic cabinet 30 being locked can be identified. As a result, identification of chemicals, which are managed objects, can quickly be done in a timely manner, even in the absence of ah administrator of the locks 33, 34, as well as in emergency situations and upon unannounced stock inspection.

What is claimed is:

1. A storage container comprising:
 a metallic housing for enclosing a managed object with an electronic tag for individual identification being attached thereto, and
 an opening portion that is provided on the metallic housing and has an opening being formed therein, the opening constituting a radio wave propagation path between; the electronic tag of the managed object enclosed in the metallic housing and exterior of the metallic housing and having a longitudinal length that is at least equal to a half wavelength of the radio wave to the transmitted.

2. The storage container according to claim 1, wherein the opening of the opening portion is sealed with a radio wave transmissive member.

3. The storage container according to claim 1, comprising a metallic reflective plate that is provided in the metallic housing, at a position facing the electronic tag.

4. The storage container according to claim 2, comprising a metallic reflective plate that is provided in the metallic housing, at a position facing the electronic tag.

\* \* \* \* \*